Nov. 12, 1929.  R. F. HEARN  1,735,247
SPARK AND THROTTLE CONTROL
Filed March 12, 1927  3 Sheets-Sheet 1
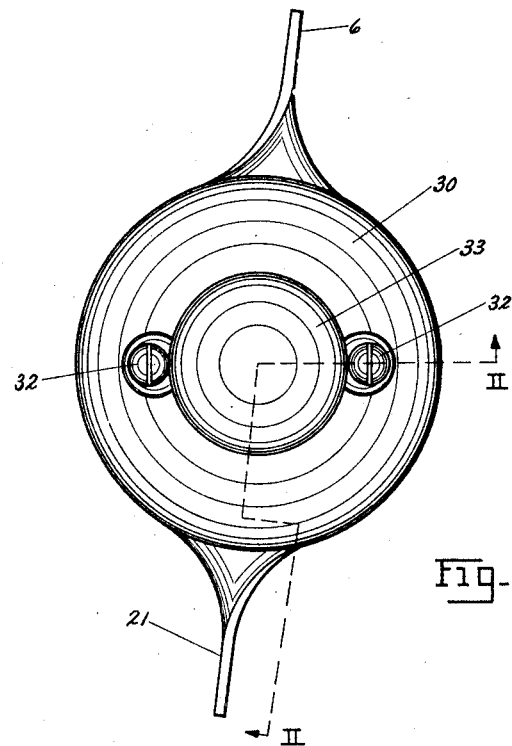
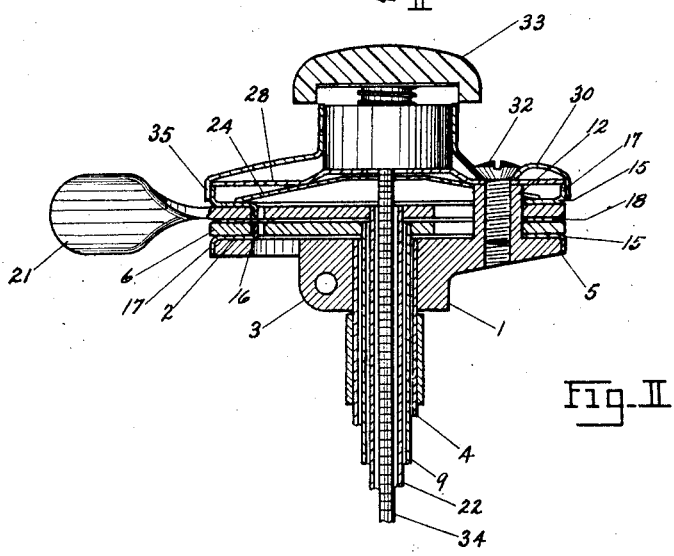
INVENTOR.
ROY F. HEARN.
BY Chester H. Braselton
ATTORNEY.

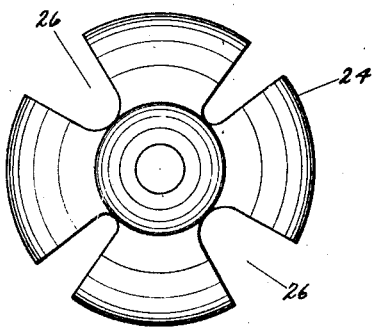
Fig. V.
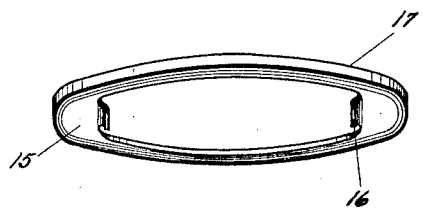
Fig. IV.
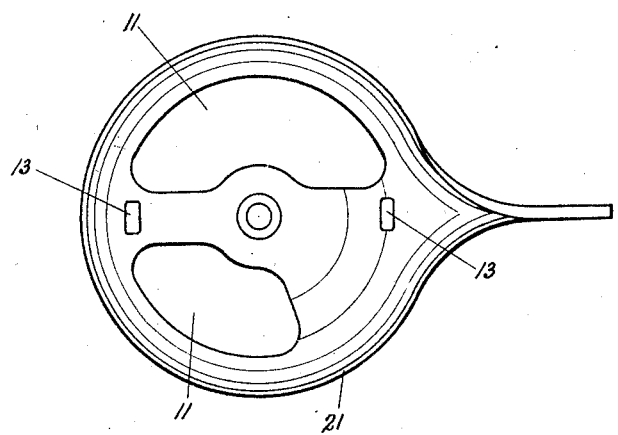
Fig. III.

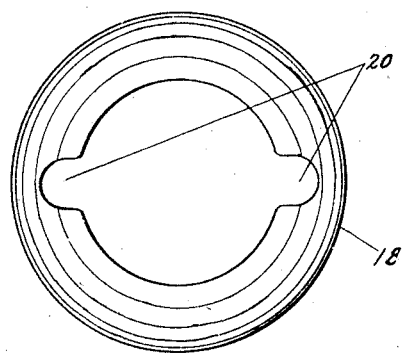
Fig. VIII.
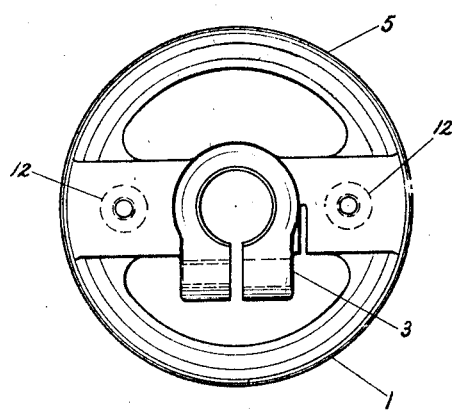
Fig. VII.
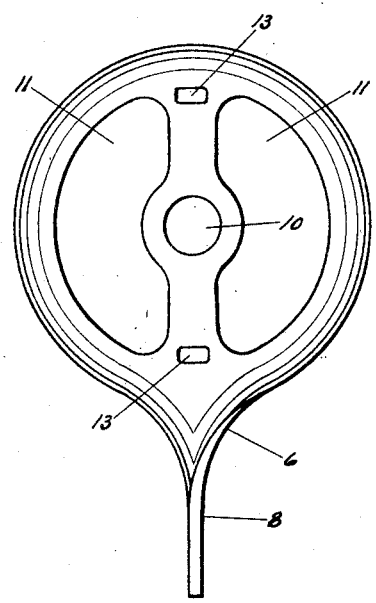
Fig. IX.
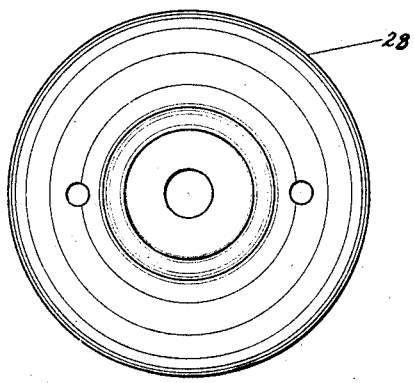
Fig. VI.

Patented Nov. 12, 1929

1,735,247

UNITED STATES PATENT OFFICE

ROY F. HEARN, OF TOLEDO, OHIO, ASSIGNOR TO THE WILLYS-OVERLAND COMPANY, OF TOLEDO, OHIO, A CORPORATION OF OHIO

SPARK AND THROTTLE CONTROL

Application filed March 12, 1927. Serial No. 174,772.

This invention relates to vehicle control mechanisms, and more particularly to control mechanisms, such as are used in connection with the steering gears of motor vehicles for operating or controlling various elements of the vehicle.

One object of the invention is to provide a simple combination of elements which is readily fabricated of pressed sheet metal parts.

Another object of the invention is to provide a control mechanism that will be of low cost.

It is a further object of the invention to provide a control mechanism composed largely of sheet metal parts, in which the axial alignment of its movable parts is maintained. These together with other objects will appear from the description to follow, in conjunction with which, for the purposes of the present application, I have illustrated one form of the invention in the accompanying drawings which may be preferred, in which:

Figure I is a plan view of a control mechanism embodying the invention.

Fig. II is a sectional view taken on lines II—II of Fig. I.

Fig. III is a plan view of the upper control lever.

Fig. IV is a perspective view of an aligning washer.

Fig. V is a plan view of the compression spider.

Fig. VI is a plan view of the cover plate.

Fig. VII is a bottom view of the support plate.

Fig. VIII is a plan view of the lever spacing plate.

Fig. IX is a plan view of the lower control lever.

Referring to the drawings in which like characters refer to like parts throughout the several views, 1 is a support, preferably a casting, having a flat upper surface 2 and a lower split hub portion 3, which is adapted to be tightly clamped to a supporting tube 4. The periphery 5 of the upper portion of support is machined circular for a purpose hereinafter described. An oscillatable lever disc 6, preferably formed from flat sheet metal stock, having an integral twisted handle portion 8, is rotatably mounted above support 1. The disc includes a circular portion having an aperture 10 in which a control tube 9 is rigidly secured as by brazing and which is co-axially disposed with the tube 4. In addition to the opening the lever disc 6 is provided with cut out portions 11 for permitting the lever to be rotated through a considerable angle without interfering with the upstanding cover supporting posts 12, that are preferably cast integrally with the support 1. Lever disc 6 is also provided with small slots 13 for a purpose hereinafter described.

A guiding washer 15 is interposed between the lever disc 6 and support 1 which includes upstanding ears 16 and a downturned circular flange 17. The ears 16 project upwardly within the slots 13, so as to engage the sides of the slots, thereby preventing relative lateral movement between the two parts, whereas the downwardly projecting flange 17 engages the circular peripheral portion 5 of the support 1. The flange 17 fits about the periphery of the support as snugly as possible without interfering with rotary movement of the lever 6 upon the support.

Above lever disc 6 is mounted a spacing washer 18 having recesses 20 that engage posts 12 for preventing rotary movement of the washer. A second lever disc 21, similar in form to lever disc 6, is mounted above spacing washer 18 and carries a second control tube 22 secured to the lever in the same manner as lever disc 6, tube 22 being smaller in size is adapted for relative rotation within the tube 9. Lever disc 21 is also provided with cutout portions 11 and slots 13 for the same purpose as the corresponding parts of lever disc 6. Above lever disc 21 is a second guiding washer 15 preferably identical with the first, but assembled in the reverse manner, so that ears 16 project downwardly to engage slots 13 in the disc 21, and the flange 17 projects upwardly. A resilient compression spider 24 having cutout portions 26 of sufficient width to clear posts 12 rests upon upper washer 15. There is also provided a cover plate 28 which rests upon spider 24, the whole assembly being held together by a cap 30, that is secured in spaced relation to the support 1, by means of posts 12 and screws 32. Cover 30 is provided with a circular, downwardly extending flange 35 that engages the flange 17 of upper washer 15 with the same clearance, and for the same purpose, as characterizes the lower washer 15 with respect to the support 1. The usual horn button 33 is mounted above cap 30 for controlling a horn (not shown) by means of conductor 34.

It may be seen from the foregoing description that I have provided a control mechanism, in which a majority of the larger parts are made of stampings, and which will have its movable parts so guided that there is little possibility of misalignment and subsequent binding.

While I have illustrated and described, somewhat in detail, one embodiment of the invention, it is to be understood that this showing and description are illustrative only, and that I do not regard the invention as limited to the details of construction illustrated and described, except in so far as I have included such limitations within the terms of the following claims.

I claim:

1. In a control mechanism for a motor vehicle, a support having a circular peripheral portion, a movable lever having a disc shaped portion upon said support, said disc portion having slots therein, a washer between said lever and said support having upturned ears engaging said slots, said washer having a downturned flange in rotatable engagement with the peripheral portion of said support for centrally locating said washer, and means for limiting the upward movement of said washer and lever.

2. In a control mechanism for a motor vehicle, a support having a circular peripheral portion, a movable lever having a disc shaped portion upon said support, a washer between said support and said lever having a portion thereof in interlocking engagement with said lever and a downturned flange in rotatable engagement with said support for centrally locating said lever and washer, a spacing plate above said lever, a second movable lever above said plate, a cover above said second plate having a circular portion, and a second guiding washer between said second lever and said cover having a portion thereof in interlocking engagement with said second lever and an upturned flange in rotatable engagement with the circular portion of said cover for centrally locating said second lever, and means for securing said cover to said support.

3. In a control mechanism for a motor vehicle, a support having a circular peripheral portion, a movable sheet metal lever upon said support having a circular flat central portion, said flat portion being of substantially the same diameter as the circular portion of said support, a washer between said lever and said support having a portion thereof in interlocking engagement with said lever and a circular downturned flange in rotatable engagement with said peripheral portion, and said washer being adapted to coact with said support and said lever for centrally locating the same and maintaining the alignment of the respective circular portions.

4. In a control mechanism for a motor vehicle, a support having a circular peripheral portion, a cover having a circular portion secured to said support and spaced therefrom, a pair of levers having circular flat central portions of substantially the same diameter as the peripheral portion of said support, a guiding washer for each lever having a portion in interlocking engagement with its respective lever, one of said washers having a downturned flange in rotatable engagement with the circular part of said support, and the other of said washers having an upturned flange in rotatable engagement with the circular part of said cover, said washers being adapted to coact with said levers and said circular parts for centrally locating said levers and maintaining the alignment of the circular portions thereof.

In testimony whereof, I affix my signature.

ROY F. HEARN.